United States Patent
Dai et al.

(10) Patent No.: US 10,494,562 B1
(45) Date of Patent: Dec. 3, 2019

(54) FLOW MODIFIER PARTICLES, FLOW MODIFIER, AND PREPARATION METHOD AND USE THEREOF

(71) Applicants: China University of Petroleum (East China), Shandong (CN); China University of Geosciences (Beijing), Beijing (CN)

(72) Inventors: Caili Dai, Shandong (CN); Qing You, Beijing (CN); Jichao Fang, Shandong (CN); Guang Zhao, Shandong (CN); Yifei Liu, Shandong (CN); Mingwei Gao, Shandong (CN); Jiaping Tao, Shandong (CN); Pan Wang, Beijing (CN)

(73) Assignees: China University of Petroleum (East China), Shandong (CN); China University of Geosciences (Beijing), Beijing (CN)

( * ) Notice: Subject to any disclaimer, the term of this patent is extended or adjusted under 35 U.S.C. 154(b) by 0 days.

(21) Appl. No.: 16/275,564

(22) Filed: Feb. 14, 2019

(30) Foreign Application Priority Data

Oct. 19, 2018 (CN) .......................... 2018 1 1223599

(51) Int. Cl.
*C09K 8/76* (2006.01)
*C09K 8/508* (2006.01)
(Continued)

(52) U.S. Cl.
CPC .......... *C09K 8/5083* (2013.01); *C09K 8/5045* (2013.01); *C09K 8/514* (2013.01);
(Continued)

(58) Field of Classification Search
CPC ........ E21B 43/26; E21B 47/122; E21B 47/14; E21B 2034/007; E21B 33/1208; E21B 33/138; E21B 34/14; E21B 41/0085; E21B 41/0092; E21B 43/267; E21B 47/01; E21B 47/06; E21B 47/16; E21B 10/42; E21B 10/55; E21B 10/5673; E21B 23/04; E21B 27/00; E21B 29/02; E21B 33/12; E21B 33/1216; E21B 33/129; E21B 33/134; E21B 33/14; E21B 34/06; E21B 34/102; E21B 34/12; E21B 34/16; E21B 41/00; E21B 43/00; E21B 43/084; E21B 43/086; E21B 43/114; E21B 43/116; E21B 43/117; E21B 43/119; E21B 43/164; E21B 43/166; E21B 43/2401; E21B 47/011; E21B 47/1015; E21B 47/12; E21B 49/00; E21B 49/008; E21B 49/08; E21B 7/28; E21B 43/16; E21B 41/02; E21B 21/062; E21B 17/00; E21B 43/25; E21B 21/063; E21B 36/008; E21B 43/24; E21B 10/00; E21B 21/003; E21B 21/06; E21B 21/08; E21B 33/068; E21B 33/13; E21B 37/06; E21B 43/04; C09K 8/805; C09K 2208/28; C09K 8/467; C09K 8/508; C09K 8/516; C09K 8/5755; C09K 8/594; C09K 8/885; C09K 8/94; C09K 8/5083; C09K 8/514; C09K 8/5045; C09K 2208/08; C09K 8/74; C09K 8/035; C09K 8/68; C09K 8/685; C09K 2208/32; C09K 8/72; C09K 8/90; C09K 8/08; C09K 8/54; C09K 8/588; C09K 8/70; C09K 2208/20; C09K 2208/26; C09K 8/76; C09K 8/52; C09K 8/602; C09K 8/86; C09K 8/887; C09K 2208/00; C09K 2208/30; C09K 8/512; C09K 8/725; C09K 8/82; C09K 2208/10; C09K 2208/22; C09K 2208/24; C09K 8/00; C09K 8/60; C09K 8/64; C09K 8/882; C09K 8/92; C09K 2208/04;
(Continued)

(56) References Cited

U.S. PATENT DOCUMENTS

2011/0277996 A1* 11/2011 Cullick ................. E21B 33/138
166/250.12

FOREIGN PATENT DOCUMENTS

CN 1439692 A 9/2003
CN 1687558 A 10/2005
(Continued)

OTHER PUBLICATIONS

Tongwa, et al. "Evaluation of a Nanocomposite Hydrogel for Water Shut-Off in Enhanced Oil Recovery Applications: Design, Synthesis, and Characterization", Journal of Applied Polymer Science, dated Jul. 17, 2012.
(Continued)

*Primary Examiner* — Kumar R Bhushan
(74) *Attorney, Agent, or Firm* — Duane Morris LLP (57) ABSTRACT

The flow modifier particle composition contain a viscoelastic base agent, a selective solubilizer, a density modifier, a sweller, and an optional plasticizer, wherein based on the total weight of the flow modifier particle composition, the content of the viscoelastic base agent is 30-90 wt %, the content of the selective solubilizer is 3-30 wt %, the content of the density modifier is 0.1-30 wt %, the content of the sweller is 1-30%, and the content of the plasticizer is 0-10 wt %. The present invention further discloses a flow modifier, which contains the flow modifier particle composition and a carrying fluid that contains water and a surfactant. The present invention further discloses a preparation method of the flow modifier, and a use of the flow modifier and the flow modifier particle composition in exploitation of fracture-cave reservoirs.

17 Claims, 2 Drawing Sheets

(51) Int. Cl.
*C09K 8/504* (2006.01)
*E21B 43/16* (2006.01)
*E21B 33/138* (2006.01)
*C09K 8/514* (2006.01)

(52) U.S. Cl.
CPC ............ *E21B 33/138* (2013.01); *E21B 43/16* (2013.01); *C09K 2208/08* (2013.01)

(58) Field of Classification Search
CPC ......................................................................
C09K 8/032; C09K 8/06; C09K 8/24;
C09K 8/40; C09K 8/44; C09K 8/50;
C09K 8/502; C09K 8/5086; C09K 8/575;
C09K 8/584; C09K 8/592; C09K 8/32;
C09K 8/36; C09K 8/532; C09K 8/536;
C09K 8/582; C09K 8/66; C09K 8/703;
C09K 8/80; C09K 8/845
See application file for complete search history.

(56) References Cited

FOREIGN PATENT DOCUMENTS

| CN | 103087694 A | | 5/2013 |
| CN | 103484086 A | | 1/2014 |
| CN | 103712843 | * | 4/2014 |
| CN | 104388068 A | | 3/2015 |
| WO | WO 2018/171812 | * | 9/2018 |

OTHER PUBLICATIONS

Liu, et al., "Investigation on Preparation and Profile Control Mechanisms of the Dispersed Particle Gels(DPG) Formed from Phenol-Formaldehyde Cross-linked Polymer Gel, Industrial & Engineering Chemistry Research" 2016,55,6284-6292.

* cited by examiner

FLOW MODIFIER PARTICLES, FLOW MODIFIER, AND PREPARATION METHOD AND USE THEREOF

PRIORITY CLAIM AND CROSS REFERENCE

The application claims priority to Chinese Application No. 201811223599.X, filed on Oct. 19, 2018, entitled "Flow modifier particle composition, flow modifier, and preparation method and use thereof", which is specifically and entirely incorporated herein by reference.

FIELD OF THE INVENTION

The present invention relates to the field of petroleum extraction, particularly to flow modifier particle composition, a flow modifier, and a preparation method of the flow modifier particle composition and the flow modifier, and a use of the flow modifier particle composition and the flow modifier in exploitation of fracture-cave reservoirs.

BACKGROUND

Fracture-cave reservoirs mainly exist in holes, caves and fractures. Karst caves and fractures are the main reservoir spaces of fracture-cave reservoirs. Fractures are the main channels that communicate karst caves. The flow characteristics of formation fluids of fracture-cave reservoirs are much different from those of sandstone reservoirs. The remaining oil in formations of fracture-cave reservoirs is rich, but the sweep volume of injection water is small and the recovery ratio is very low.

At present, there are mainly three methods for flow modification in fracture-cave reservoirs: the first method is to inject a gas ($CO_2$ or $N_2$) or light fluid to attain a purpose of sweeping the crude oil at higher positions; the second method is to plug dominant flow channels with solidified particles, i.e., inject solidified particles to plug dominant flow channels around the well, so as to attain a purpose of modifying the flows and improving the swept volume; the third method is to borrow the plugging modification method for sandstone reservoirs, i.e., inject a gel plugging agent to improve the swept volume. Gas injection can only solve the problem of vertical sweeping in fracture-cave reservoirs, but is difficult to improve planar sweeping; solidified particles are difficult to enter into the deep strata, have high density, are susceptible to dilution by formation water, and can only act on areas in the vicinity of the well; gel systems are susceptible to dilution by cavern water, are hard to build up structural strength in deep strata, have limited temperature-resistance and salinity-resistance properties, and consequently are difficult to use for deep flow modification for demanding high-temperature high-salinity fracture-cave reservoirs.

In China, fracture-cave reservoirs are the most abundant in the Western China region, where the formation conditions are harsh and the formation temperature is usually higher than 90° C. Especially, in some new reservoir blocks, the temperature is as high as 180° C. and the salinity is higher than $20 \times 10^4$ mg/L. Consequently, conventional plugging agents can't meet the requirements of oil development and application.

SUMMARY OF THE INVENTION

To solve the problems in the prior art, i.e., it is difficult to realize deep flow modification in formations and the swept volume is too small for fracture-cave reservoirs, especially for high-temperature high-salinity fracture-cave reservoirs, the present invention provides a flow modifier particle composition (or particles), a flow modifier, a preparation method of the flow modifier particle composition and the flow modifier, and a use of the flow modifier particle composition and the flow modifier in exploitation of fracture-cave reservoirs.

To attain the object described above, in a first aspect, the present invention provides a flow modifier particle composition containing a viscoelastic base agent, a selective solubilizer, a density modifier, a sweller, and an optional plasticizer, wherein based on the total weight of the flow modifier particle composition, the content of the viscoelastic base agent is 30-90 wt %, the content of the selective solubilizer is 3-30 wt %, the content of the density modifier is 0.1-30 wt %, the content of the sweller is 1-30%, and the content of the plasticizer is 0-10 wt %; wherein the viscoelastic base agent is selected from at least one of polyethylene, polystyrene, polypropylene, nylon and ABS resin, the selective solubilizer is selected from at least one of C5 petroleum resin, C9 petroleum resin, rosin resin and rosin modified phenolic resin, the density modifier is hollow beads and/or coal ash, the sweller is selected from at least one of expanded graphite, modified starch, polyacrylamide and cross-linked cellulose, and the plasticizer is fibers and/or whiskers.

Preferably, based on the total weight of the flow modifier particle composition, the content of the viscoelastic base agent is 50-75 wt %, the content of the selective solubilizer is 10-30 wt %, the content of the density modifier is 2-8 wt %, the content of the sweller is 5-15%, and the content of the plasticizer is 0.1-10 wt %.

Preferably, the viscoelastic base agent is selected from at least one of polyethylene, polystyrene, and nylon.

Preferably, the selective solubilizer is C5 petroleum resin and/or C9 petroleum resin.

Preferably, the fibers are selected from at least one of natural fibers, artificial fibers and synthetic fibers, and the whiskers are selected from at least one of calcium sulfate whiskers, silicon carbide whiskers and gypsum whiskers.

Preferably, the density modifier is a low-density material at 0.2-2.9 $g/cm^3$ density. The hollow beads may be hollow glass beads.

Preferably, the polyacrylamide may be anionic polyacrylamide, and the cross-linked cellulose may be cross-linked carboxymethyl cellulose.

Preferably, based on the total weight of the flow modifier particle composition before the flow modifier particle composition are dissolved in crude oil, the percentage of residue of the flow modifier particle composition after the flow modifier particle composition are dissolved in crude oil is lower than 30 wt %.

Preferably, the density of the flow modifier particle composition is 0.80-1.20 $g/cm^3$, and the particle diameter of the flow modifier particle composition is 0.2-20.0 mm.

Preferably, the swelling ratio of the flow modifier particle composition is 1-30.

In a second aspect, the present invention provides a flow modifier, which contains the flow modifier particle composition described above and a carrying fluid that contains water and a surfactant.

Preferably, the weight ratio of the flow modifier particle composition to the carrying fluid is 1-30:70-99.

Preferably, the absolute density difference between the flow modifier particle composition and the carrying fluid is no more than 0.02 $g/cm^3$.

Preferably, the weight ratio of the water to the surfactant is 99.50-99.99:0.01-0.50.

Preferably, the surfactant is polyoxyethylene carboxylate and/or betaine, e.g., sodium polyoxyethylene carboxylate and/or hydroxysulfobetaine.

In a third aspect, the present invention provides a method for preparing the above-mentioned flow modifier for fracture-cave reservoir, which comprises:

(1) adding the viscoelastic base agent, the selective solubilizer, the density modifier, the sweller, and the optional plasticizer sequentially, and mixing them by intensive stirring to obtain a mixture;

(2) molding the mixture obtained in the step (1) by extrusion molding to obtain flow modifier particle composition; and (3) mixing the flow modifier particle composition obtained in the step (2) with the carrying fluid to obtain the flow modifier.

Preferably, in the step (2), the temperature of the extrusion molding is 150-300° C.

In a fourth aspect, the present invention provides a method of using the above-mentioned flow modifier particle composition or flow modifier in exploitation of fracture-cave reservoirs.

The flow modifier particle composition provided in the invention have excellent temperature-resistance property, the temperature-resistant range is 80-230° C., and high salinity-resistance property up to $24\times10^4$ mg/L, and can work well under high-temperature and high-salinity conditions in China and foreign countries; the flow modifier particle composition have excellent adhesiveness under the high-temperature formation condition, and a plurality of particles adhere to each other to form aggregates when they contact with each other, attaining a good water flow channel plugging effect at high temperatures; the flow modifier particle composition have a good swelling property, and can achieve deep flow modification in oil/water wells and increase the swept volume of water flooding by virtue of swelling of individual particles and aggregation of a plurality of particles.

Other features and advantages of the present invention will be further detailed in the examples hereunder.

BRIEF DESCRIPTION OF DRAWINGS

The accompanying drawings are provided here to facilitate further understanding on the present invention, and constitute a part of this document. They are used in conjunction with the following embodiments to explain the present invention, but shall not be comprehended as constituting any limitation to the present invention.

DETAILED DESCRIPTION OF THE EMBODIMENTS

Hereunder some embodiments of the present invention will be detailed. It should be understood that the embodiments described here are only provided to describe and explain the present invention, but shall not be deemed as constituting any limitation to the present invention.

The ends points and any value in the ranges disclosed in the present invention are not limited to the exact ranges or values; instead, those ranges or values shall be comprehended as encompassing values that are close to those ranges or values. For numeric ranges, the end points of the ranges, the end points of the ranges and the discrete point values, and the discrete point values may be combined with each other to obtain one or more new numeric ranges, which shall be deemed as having been disclosed specifically in this document.

In the present invention, those skilled in the art should understand that "flow modification" refers to modification of water flow channel; "viscoelasticity" refers to viscosity and elasticity; "adhesive high molecular polymer" refers to a high molecular polymer that has adhesiveness after it is softened up.

The present invention provides a type of flow modifier particles (or a flow modifier particle composition) comprising a viscoelastic base agent, a selective solubilizer, a density modifier, a sweller, and an optional plasticizer, wherein based on the total weight of the flow modifier particle composition, the content of the viscoelastic base agent is 30-90 wt %, the content of the selective solubilizer is 3-30 wt %, the content of the density modifier is 0.1-30 wt %, the content of the sweller is 1-30%, and the content of the plasticizer is 0-10 wt %; wherein the viscoelastic base agent is selected from at least one of polyethylene, polystyrene, polypropylene, nylon and ABS resin, the selective solubilizer is selected from at least one of C5 petroleum resin, C9 petroleum resin, rosin resin and rosin modified phenolic resin, the density modifier is hollow beads and/or coal ash, the sweller is selected from at least one of expanded graphite, modified starch, polyacrylamide, and cross-linked cellulose, and the plasticizer is fibers and/or whiskers.

The components in the flow modifier particle composition prepared in the present invention cooperate with each other in a synergetic manner. Thus, the flow modifier particle composition have excellent temperature-resistance, adhesiveness, swelling, and salinity-resistance properties, can realize selective modification of deep dominant water flow channels in the formation, and thereby can improve the swept volume in the fracture-cave reservoir.

In the flow modifier particle composition according to the present invention, preferably, based on the total weight of the flow modifier particle composition, the content of the viscoelastic base agent is 50-75 wt %, e.g., 50 wt %, 60 wt %, 65 wt %, 70 wt %, 75 wt %, and a range constituted by any two point values; the content of the selective solubilizer is 10-30 wt %, e.g., 10 wt %, 15 wt %, 21 wt %, 26 wt %, 30 wt %, and a range constituted by any two point values; the content of the density modifier is 2-8 wt %, e.g., 3.5 wt %, 4.5 wt %, 5.5 wt %, 7 wt %, 8 wt %, and a range constituted by any of two point values; the content of the sweller is 5-15 wt %, e.g., 5 wt %, 7 wt %, 9 wt %, 10 wt %, 13 wt %, and a range constituted by any two point values; the content of the plasticizer is 0.1-10 wt %, e.g., 0.5 wt %, 2 wt %, 4 wt %, 6 wt %, 8 wt %, and a range constituted by any of two point values; under the preferred conditions, the obtained flow modifier particle composition have better temperature-resistance, adhesiveness, swelling, and salinity-resistance properties, and can further realize selective modification of deep dominant water flow channels in the formation, and thereby can improve the swept volume in the fracture-cave reservoir.

In the flow modifier particle composition according to the present invention, the term "viscoelastic base agent" refers to an adhesive high molecular polymer, which is a high molecular polymer that has adhesiveness after it is softened up; preferably, the viscoelastic base agent is selected according to the formation temperature; specifically, the adhesive high molecular polymer is selected from polyethylene and/or polypropylene if the formation temperature is 100-120° C.; the adhesive high molecular polymer is selected from polystyrene and/or ABS resin if the formation temperature is 120-140° C.; the adhesive high molecular polymer is selected from nylon 6 and/or nylon 610 if the formation temperature is 170-190° C.; thus, the flow modifier particle composition always have excellent adhesiveness for different formation temperatures. The flow modifier particle composition obtained by mixing the viscoelastic base agent with other components of flow modifier particle composition specified in the present invention in specific content can be softened up under the high formation temperature condition, and a plurality of particles can adhere to each other and form large-size aggregates when they contact with each other; thus, the flow modifier particle composition can plug dominant water flow channels by means of bridging or direct plugging.

In the flow modifier particle composition according to the present invention, the term "selective solubilizer" is a resin dissolved in crude oil at a ratio that the quantity of resin dissolved in 100 g crude oil at 140° C. is equal to or greater than 100 g; preferably, the resin is selected according to the formation temperature; specifically, the resin is selected from rosin resin and/or C5 petroleum resin if the formation temperature is 100-120° C., or the resin is selected from C9 petroleum resin if the formation temperature is 120-180° C. The flow modifier particle composition obtained by mixing the selective solubilizer with other components of flow modifier particle composition specified in the present invention in a specific content can be dissolved in crude oil but is insoluble in water, can selectively plug deep water flow channels (especially dominant water flow channels) in the formation but don't plug oil flow channels, and thereby is favorable for modification of deep flow channels and water plugging in the vicinity of the well. Under the preferred condition, the flow modifier particle composition in the present invention are oil-water selective particles, can selective plug water flow channel but don't plug oil flow channels, and are favorable for modification of deep flow channels and water plugging in the vicinity of the well. Preferably, based on the total weight of the flow modifier particle composition before the flow modifier particle composition are dissolved in crude oil, the percentage of residue of the flow modifier particle composition after the flow modifier particle composition are dissolved in crude oil is lower than 30 wt %; specifically, after 100 parts by weight flow modifier particle composition are dissolved in 400 parts by weight crude oil at 140° C., the percentage of residue of the flow modifier particle composition is lower than 30 parts by weight.

The inventor of the present invention has further found in the research; the plugging strength of the flow modifier particle composition in fractures can be further improved if the flow modifier particle composition contain a plasticizer. Hence, preferably, based on the total weight of the flow modifier particle composition, the content of the plasticizer is 1-5 wt %. Preferably, the fibers are selected from at least one of natural fibers, artificial fibers (e.g., it can be made of artificial chopped fibers), and synthetic fibers, and the whiskers are selected from at least one of calcium sulfate whiskers, silicon carbide whiskers, and gypsum whiskers.

In the flow modifier particle composition according to the present invention, the density of the density modifier may be 0.2-2.9 $g/cm^3$; preferably, the hollow beads are hollow glass beads, and the density of the hollow beads may be 0.2-0.8 $g/cm^3$. Wherein, the density of the coal ash may be 2.5-2.7 $g/cm^3$. The density modifier can modify the density of the flow modifier particle composition, so that the obtained flow modifier particle composition have controllable density, and can be carried by the carrying fluid into the formation.

In the flow modifier particle composition according to the present invention, the sweller is selected according to the formation temperature; specifically, a material that expends under heat, such as expanded graphite, is used as the sweller if the formation temperature is higher than 140° C.; a material that swells when it absorbs water, such as modified starch, polyacrylamide (e.g., anionic polyacrylamide), or cross-linked cellulose (e.g., cross-linked carboxymethyl cellulose), etc., may be used as the sweller if the formation temperature is equal to or lower than 140° C. With the sweller, the flow modifier particle composition have an excellent swelling property; preferably, the swelling ratio of the flow modifier particle composition may be 1-30, e.g., 1, 1.5, 2, 5, 6, 10, 15, 25, 30, and a range constituted by any to point values. The swelling ratio refers to the ratio of the volume of the flow modifier particle composition after aging under the high formation temperature condition to the volume of the flow modifier particle composition before aging. Thus it is seen: the flow modifier particle composition in the present invention are swelling particles, in which the individual particles can swell and a plurality of particles can aggregate and form large-size aggregates, and thereby the flow modifier particle composition realize deep flow modification for an oil/water well and increase the swept volume of water flooding.

In the flow modifier particle composition according to the present invention, preferably, the density of the flow modifier particle composition is 0.80-1.20 $g/cm^3$, the particle diameter of the flow modifier particle composition is 0.2-20.0 mm. Namely, the flow modifier particle composition have low density, are insusceptible to dilution by formation water, and can be carried into the deep part of the formation easily.

According to a preferred embodiment of the present invention, the flow modifier particle composition contain a viscoelastic base agent, a selective solubilizer, a density modifier, a sweller, and a plasticizer, wherein based on the total weight of the flow modifier particle composition, the content of the viscoelastic base agent is 65-73 wt %, the content of the selective solubilizer is 15-21 wt %, the content of the density modifier is 2.5-4 wt %, the content of the sweller is 3-6%, and the content of the plasticizer is 1.3-2.8 wt %; the viscoelastic base agent is polystyrene, the selective solubilizer is C9 petroleum resin, the density modifier is coal ash, the sweller is cross-linked carboxymethyl cellulose, and the plasticizer is artificial chopped fibers.

The flow modifier particle composition in the present invention have excellent temperature-resistance, swelling, and adhesiveness properties, and are resistant to salinity higher than $22 \times 10^4$ mg/L when they are applied in exploitation of fracture-cave reservoirs, and can realize deep flow modification and improve the swept volume, mainly owing to the cooperation among the viscoelastic base agent, selective solubilizer, density modifier, sweller, and optional plasticizer, especially the cooperation among the aforesaid components in specific contents.

In a second aspect, the present invention provides a flow modifier, which contains the flow modifier particle composition described above and a carrying fluid that contains water and a surfactant.

In the flow modifier in the present invention, the carrying fluid is active water fluid with viscosity equivalent to the viscosity of water, and can disperse the flow modifier particle composition well so that the flow modifier particle composition are insusceptible to the influence of the oleophilic and hydrophobic surface of the flow modifier, and can inhibit agglomeration of the flow modifier particle composition in the vicinity of the well bore and thereby prevent plugging in the vicinity of the well.

In the flow modifier according to the present invention, preferably, the weight ratio of the flow modifier particle composition to the carrying fluid is 1-30:70-99, so that the flow modifier particle composition can be dispersed in the carrying fluid better, and the flow modifier particle composition may be carried into the formation more easily.

In the flow modifier according to the present invention, preferably, the absolute density difference between the flow modifier particle composition and the carrying fluid is no more than 0.02 $g/cm^3$; under that preferred condition, the density of the flow modifier particle composition is close to the density of the carrying fluid, and thereby the flow modifier particle composition can be carried into the deep portion of the formation easily. In addition, the carrying fluid has low viscosity, and the fluid characteristics of the carrying fluid are insusceptible to the influence of contact with the formation water. Therefore, the carrying fluid can be injected by an ordinary flow modification pump into the well successfully, and the frictional resistance is equivalent to the frictional resistance encountered when water is injected into the formation.

In the flow modifier according to the present invention, preferably, the weight ratio of the water to the surfactant is 99.50-99.99:0.01-0.50.

In the flow modifier according to the present invention, the surfactant may be any surfactant in the art; preferably, the surfactant is selected from surfactants that have high activity under high-temperature and high-salinity conditions; further preferably, the surfactant is polyoxyethylene carboxylate (e.g., sodium polyoxyethylene carboxylate) and/or betaine (e.g., hydroxysulfobetaine). According to a preferred embodiment of the present invention, the surfactant is hydroxysulfobetaine.

In a third aspect, the present invention provides a method for preparing the above-mentioned flow modifier, which comprises:

(1) adding the viscoelastic base agent, the selective solubilizer, the density modifier, the sweller, and the optional plasticizer sequentially, and mixing them by intensive stirring to obtain a mixture;

(2) molding the mixture obtained in the step (1) by extrusion molding to obtain flow modifier particle composition; and (3) mixing the flow modifier particle composition obtained in the step (2) with the carrying fluid to obtain the flow modifier.

The inventor of the present invention has found in the research: by adding and mixing the viscoelastic base agent, the selective solubilizer, the density modifier, the sweller, and the optional plasticizer sequentially, the final recovery ratio of oil reservoir and the fracture plugging capability can be further improved.

In the preparation method in the present invention, the step (2) may further comprise shearing and rounding, and the particle diameter of the prepared flow modifier particle composition is 0.2-20.0 mm.

In the preparation method in the present invention, preferably, in the step (2), the temperature of the extrusion molding is 150-300° C.

In the method according to the present invention, there is no particular restriction on the methods of the extrusion molding, shearing, and rounding. In other words, conventional methods in the art may be used. For example, a double screw extrusion machine may be used for the extrusion molding, and a mechanical shearing machine may be used for the shearing.

In a fourth aspect, the present invention provides a method of using the above-mentioned flow modifier particle composition or flow modifier in exploitation of fracture-cave reservoirs. The method of using is to plug dominant flow channels with flow modifier particle composition or flow modifier, i.e., to inject flow modifier particle composition or flow modifier to plug dominant flow channels around the well, so as to attain a purpose of modifying the flows and improving the swept volume.

The method of using described in the present invention is especially applicable to high-temperature high-salinity fracture-cave reservoirs.

Hereunder the present invention will be detailed in embodiments.

In the following examples and comparative examples, unless otherwise specified, all of the materials are commercially available.

The anionic polyacrylamide is from Beijing Purui Youte Energy Technology Co., Ltd., and the product code is PRYT-1.

The polyethylene is from Shandong Shitar Oil Field Technical Service Inc., and the product code is JYX.

The polystyrene is from Shandong Shitar Oil Field Technical Service Inc., and the product code is JBYX.

The C5 petroleum resin is from Shandong Shitar Oil Field Technical Service Inc., and the product code is SDC5.

The C9 petroleum resin is from Shandong Shitar Oil Field Technical Service Inc., and the product code is SDC9.

The hollow glass beads are from Shandong Shitar Oil Field Technical Service Inc., and the product code is SDWZ.

The artificial chopped fibers are from Shandong Shitar Oil Field Technical Service Inc., and the product code is SDXW.

The coal ash is from Shandong Shitar Oil Field Technical Service Inc., and the product code is SDH.

The cross-linked carboxymethyl cellulose is from Shandong Shitar Oil Field Technical Service Inc., and the product code is SDJW.

The hydroxysulfobetaine is from Shandong Shitar Oil Field Technical Service Inc., and the product code is SDSB.

The sodium polyoxyethylene carboxylate is from Qingdao Shike Chemical Technology Co., Ltd., and the product code is SKSN.

The modified starch is from Shandong Shitar Oil Field Technical Service Inc., and the product code is SDDF.

The expanded graphite is from Qingdao Oere Graphite Co., Ltd., and the product code is OER-KP50.

The nitrile-butadiene rubber is from Jingjiang Tonggao Chemicals Co., Ltd., and the product name is PNBR-18.

The testing methods involved in the following examples and comparative examples are as follows:

The density of the flow modifier particle composition is measured and calculated by dividing the mass by the volume, the mass of the particles is measured with a weighing method, the volume of the particles is measured according to Bohr's law on helium, and the unit of the density is g/cm$^3$. The particle diameters of a plurality of flow modifier particle composition are measured with Vernier calipers for several times, and the average of the measured values is taken as the particle diameter of the flow modifier particle composition, in unit of mm. The temperature-resistance property of the flow modifier particle composition is measured by means an aging test as follows: the flow modifier particle composition are mixed with simulated formation water (the simulated formation water is simulated water that is prepared from deionized water on the basis of analysis of ions in injected water in the formation and contain the same ions at the same ion concentrations as the injected water in the simulation), and the mixture is sealed and held under different formation temperature conditions for 7 days for aging, then the mixture is taken out, and the particles are observed for change of shape and size. The particles are deemed as being resistant to corresponding formation temperature if the particle size is greater than or equal to that in the system before aging; the unit is °C.

The adhesiveness of the flow modifier particle composition is measured with a direct observation method; specifically, a plurality of flow modifier particle composition are mixed with simulated formation water, and the mixture is sealed and held at a corresponding formation temperature that the flow modifier particle composition can withstand for 7 days for aging; then the morphology of the particles is observed. The particles are deemed as having adhesiveness if they adhere to each other and the aggregates of the particles don't split apart when the sealed bottle is shaken.

The swelling ratio of the flow modifier particle composition is calculated as the ratio of the volume of the flow modifier particle composition after aging to the volume of the flow modifier particle composition before aging; specifically, the flow modifier particle composition are mixed with simulated formation water, the mixture is sealed and held at a corresponding formation temperature that the flow modifier particle composition can withstand for 7 days for aging; then the mixture is taken out, and the volume of the flow modifier particle composition after aging and the volume of the flow modifier particle composition before aging are measured according to the Bohr's law on helium, and the swelling ratio is calculated accordingly.

Example 1

(1) 60 parts by weight polyethylene, 30 parts by weight C5 petroleum resin, 2 parts by weight coal ash, 5 parts by weight anionic polyacrylamide, and 3 parts by weight artificial chopped fibers were added sequentially, mixed by intensive stirring, and set aside for later use;

(2) A double screw extrusion machine is heated up to 160° C., and the mixed composite material is poured slowly into the double screw extrusion machine and is extruded;

(3) The extruded material is sheared by a mechanical shearing machine to particles in 1-2 mm particle diameter and then were rounded, so that flow modifier particle composition were obtained. The properties of the flow modifier particle composition were measured, and the results were shown in Table 1.

A flow modifier is prepared by mixing carrying fluid at 1.07 g/cm$^3$ density with the flow modifier particle composition at 80:20 weight ratio, wherein, based on the total weight of the carrying fluid, the carrying fluid contains 0.1 wt % hydroxysulfobetaine, water, and sodium chloride for adjusting the density.

Example 2

(1) 70 parts by weight polystyrene, 20 parts by weight C9 petroleum resin, 3 parts by weight coal ash, 5 parts by weight cross-linked carboxymethyl cellulose, and 2 parts by weight artificial chopped fibers were added sequentially, mixed by intensive stirring, and set aside for later use;

(2) A double screw extrusion machine was heated up to 180° C., and the mixed composite material was poured slowly into the double screw extrusion machine and is extruded;

(3) The extruded material is sheared by a mechanical shearing machine to particles in 2-3 mm particle diameter and then were rounded, so that flow modifier particle composition were obtained. The properties of the flow modifier particle composition were measured, and the results were shown in Table 1.

Figure 1:
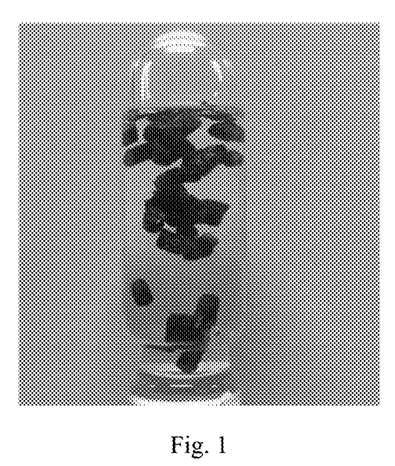
FIG. 1 shows a flow modifier prepared in example 2 of the present invention.

A flow modifier was prepared by mixing carrying fluid at 1.09 g/cm$^3$ density with the flow modifier particle composition at 80:20 weight ratio (as shown in FIG. 1), wherein, based on the total weight of the carrying fluid, the carrying fluid contains 0.1 wt % hydroxysulfobetaine, water, and sodium chloride for adjusting the density.

Example 3

(1) 75 parts by weight nylon 6 powder, 10 parts by weight C9 petroleum resin, 6 parts by weight hollow glass beads, 8 parts by weight expanded graphite, and 1 parts by weight calcium sulfate whiskers were added sequentially, mixed by intensive stirring, and set aside for later user;

(2) A double screw extrusion machine was heated up to 270° C., and the mixed composite material was poured slowly into the double screw extrusion machine and is extruded;

(3) The extruded material was sheared by a mechanical shearing machine to particles in 1-2 mm particle diameter and then were rounded, so that flow modifier particle composition were obtained. The properties of the flow modifier particle composition were measured, and the results were shown in Table 1.

A flow modifier is prepared by mixing carrying fluid at 1.19 g/cm$^3$ density with the flow modifier particle composition at 80:20 weight ratio, wherein, based on the total weight of the carrying fluid, the carrying fluid contains 0.1 wt % sodium polyoxyethylene carboxylate, water, and sodium chloride for adjusting the density.

Example 4

(1) 50 parts by weight polyethylene, 22 parts by weight C5 petroleum resin, 8 parts by weight hollow glass beads, 15 parts by weight modified starch, and 5 parts by weight calcium sulfate whiskers were added sequentially, mixed by intensive stirring, and set aside for later user;

(2) A double screw extrusion machine was heated up to 150° C., and the mixed composite material is poured slowly into the double screw extrusion machine and is extruded;

(3) The extruded material is sheared by a mechanical shearing machine to particles in 1-2 mm particle diameter and then were rounded, so that flow modifier particle composition were obtained. The properties of the flow modifier particle composition were measured, and the results were shown in Table 1.

A flow modifier is prepared by mixing carrying fluid at 1.12 g/cm³ density with the flow modifier particle composition at 80:20 weight ratio, wherein, based on the total weight of the carrying fluid, the carrying fluid contains 0.1 wt % hydroxysulfobetaine, water, and sodium chloride for adjusting the density.

Example 5

A flow modifier is prepared with the method described in the example 2, but the flow modifier particle composition don't contain artificial chopped fibers, and the density of the carrying fluid is adjusted to be equal to the density of the prepared flow modifier particle composition. The properties of the flow modifier particle composition were shown in Table 1.

Example 6

A flow modifier is prepared with the method described in the example 2, but the density modifier in the flow modifier particle composition is low-density vermiculite, and the density of the carrying fluid is adjusted to be equal to the density of the prepared flow modifier particle composition. The properties of the flow modifier particle composition were shown in Table 1.

Example 7

A flow modifier is prepared with the method described in the example 2, but the sweller in the flow modifier particle composition is calcium sulphoaluminate, and the density of the carrying fluid is adjusted to be equal to the density of the prepared flow modifier particle composition. The properties of the flow modifier particle composition were shown in Table 1.

Example 8

A flow modifier is prepared with the method described in the example 2, but the plasticizer in the flow modifier particle composition is nitrile-butadiene rubber, and the density of the carrying fluid is adjusted to be equal to the density of the prepared flow modifier particle composition. The properties of the flow modifier particle composition were shown in Table 1.

Example 9

Flow modifier particle composition were prepared with the method described in the example 2, and then a flow modifier is prepared by mixing a carrying fluid with the prepared flow modifier particle composition at 80:20 weight ratio, but the carrying fluid doesn't contain the surfactant. The properties of the flow modifier particle composition were shown in Table 1.

Example 10

A flow modifier is prepared with the method described in the example 2 but the components of the flow modifier particle composition were added in the following order: 2 parts by weight artificial chopped fibers, 5 parts by weight cross-linked carboxymethyl cellulose, 3 parts by weight coal ash, 20 parts by weight C9 petroleum resin, and 70 parts by weight polystyrene. The properties of the flow modifier particle composition were shown in Table 1.

Comparative Example 1

A flow modifier is prepared with the method described in the example 2, but the flow modifier particle composition don't contain polystyrene, and the density of the carrying fluid is adjusted to be equal to the density of the prepared flow modifier particle composition. The properties of the flow modifier particle composition were shown in Table 1.

Comparative Example 2

A flow modifier is prepared with the method described in the example 2, but the flow modifier particle composition don't contain C9 petroleum resin, and the density of the carrying fluid is adjusted to be equal to the density of the prepared flow modifier particle composition. The properties of the flow modifier particle composition were shown in Table 1.

Comparative Example 3

A flow modifier is prepared with the method described in the example 2, but the flow modifier particle composition don't contain coal ash, and the density of the carrying fluid is adjusted to be equal to the density of the prepared flow modifier particle composition. The properties of the flow modifier particle composition were shown in Table 1.

Comparative Example 4

A flow modifier is prepared with the method described in the example 2, but the flow modifier particle composition don't contain cross-linked carboxymethyl cellulose, and the density of the carrying fluid is adjusted to be equal to the density of the prepared flow modifier particle composition. The properties of the flow modifier particle composition were shown in Table 1.

TABLE 1

| Sample | Density (g/cm³) | Particle diameter (mm) | Maximum withstand temperature (° C.) | Adhesiveness | Swelling ratio |
| --- | --- | --- | --- | --- | --- |
| Example 1 | 1.07 | 1-2 | 90 | Adhesive | 2.7 |
| Example 2 | 1.09 | 2-3 | 140 | Adhesive | 3.2 |
| Example 3 | 1.19 | 1-2 | 180 | Adhesive | 2.9 |
| Example 4 | 1.12 | 1-2 | 90 | Adhesive | 3.6 |
| Example 5 | 1.09 | 2-3 | 140 | Adhesive | 3.2 |
| Example 6 | 1.08 | 2-3 | 140 | Adhesive | 3.0 |
| Example 7 | 1.09 | 2-3 | 140 | Adhesive | 2.5 |
| Example 8 | 1.08 | 2-3 | 140 | Adhesive | 3.2 |
| Example 9 | 1.09 | 2-3 | 140 | Adhesive | 3.2 |
| Example 10 | 1.09 | 2-3 | 140 | Adhesive | 2.9 |
| Comparative example 1 | Unable to form regular particles | | | | |
| Comparative example 2 | 1.08 | 2-3 | 140 | Adhesive | 3.2 |
| Comparative example 3 | 1.04 | 2-3 | 140 | Adhesive | 3.2 |
| Comparative example 4 | 1.09 | 2-3 | 140 | Adhesive | 1.0 |

Test Case 1

This test case is used to test the fracture-cave reservoir recovery ratio improvement effect attained by the flow modifier particle composition and the flow modifier.

The physical mockup is a gravel core barrel mockup, the core barrel is in 25 mm diameter and 100 mm length, and the gravels are in 3-5 mm diameter, with 21 mL pore volume.

The water used in the test is tap water, and the oil used in the test is crude oil (50 mPa·s, @25° C.).

Figure 4:
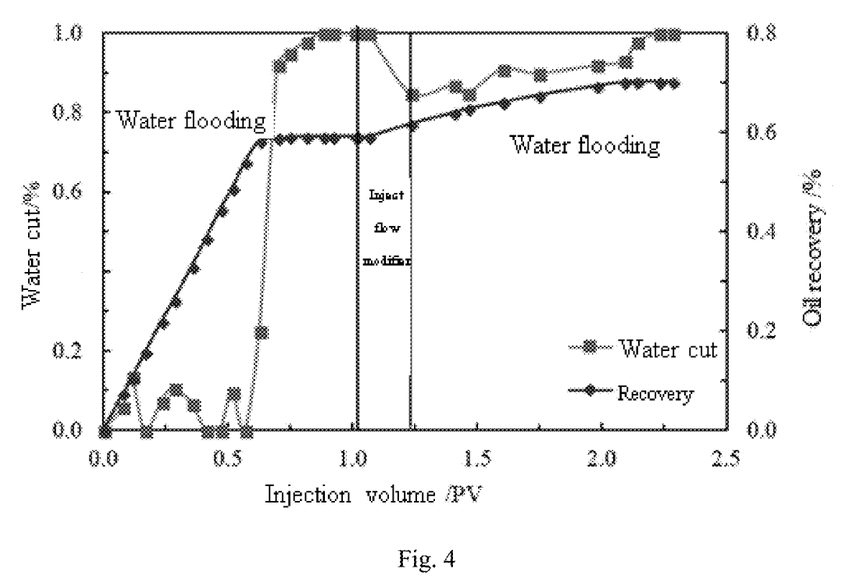
FIG. 4 shows improved recovery ratio curve and water cut curve (at 140° C.) achieved by the flow modifier prepared in example 2 in a fracture-cave reservoir.

The recovery ratios were tested at corresponding formation temperatures that the flow modifier particle composition in the examples 1-10 and comparative examples 2-4 can withstand (as shown in Table 1); specifically, the gravel core barrel mockup is saturated with oil, and then water flooding is carried out at 0.5 mL/min. water injection rate; when the water cut reaches 98% or above, the flow modifiers in the examples 1-10 and comparative examples 2-4 were injected in 4.5 mL volume respectively; after 12 h aging, water flooding is carried out; the recovery ratios attained (%) in the examples and comparative examples before and after the respective flow modifiers were added were measured respectively. The test results were shown in Table 2. Improved recovery ratio curve and water cut curve (at 140° C.) achieved by the flow modifier prepared in the example 2 in a fracture-cave reservoir were shown in FIG. 4.

It is seen from the test results: with the flow modifier particle composition and the flow modifier provided in the present invention, the recovery ratio of a high-temperature fracture-cave reservoir can be improved significantly. That further proves the flow modifier particle composition provided in the present invention can selectively plug water flow channels and have less effect on oil flow channels, is helpful for deep flow modification in the formation, and can improve the swept volume in the oil reservoir.

TABLE 2

| | Recovery ratio (%) | | Improved percentage |
| --- | --- | --- | --- |
| | Before the flow modifier is added | After the flow modifier is added | of recovery ratio (%) |
| Example 1 | 59.3 | 70.4 | 11.1 |
| Example 2 | 59.0 | 70.5 | 11.5 |
| Example 3 | 59.0 | 70.0 | 11.0 |
| Example 4 | 59.1 | 70.3 | 11.2 |
| Example 5 | 59.1 | 69.6 | 10.5 |
| Example 6 | 59.0 | 69.4 | 10.4 |
| Example 7 | 59.0 | 69.7 | 10.7 |
| Example 8 | 59.2 | 69.8 | 10.6 |
| Example 9 | 59.0 | 69.8 | 10.8 |
| Example 10 | 59.1 | 70.1 | 11.0 |
| Comparative example 1 | / | / | / |
| Comparative example 2 | 58.9 | 66.9 | 8.0 |
| Comparative example 3 | 59.0 | 65.8 | 6.8 |
| Comparative example 4 | 59.3 | 62.5 | 3.2 |

Test Case 2

This test case is used to test the salinity-resistant property of the flow modifier particle composition.

Figure 2:
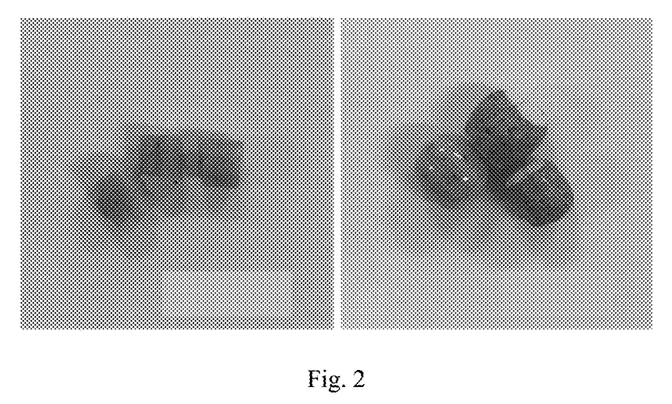
FIG. 2 shows comparison of the flow modifier particle composition prepared in example 2 of the present invention before and after aging at 140° C.

The flow modifier particle composition in the examples 1-10 and comparative examples 2-4 were immersed in saline water at $24\times10^4$ mg/L salinity at corresponding formation temperatures that the flow modifier particle composition can withstand (as shown in Table 1), wherein, the salinity refers to the sum of contents of inorganic ions in the simulated formation water, including $Na^+$, $Ca^{2+}$, $Mg^{2+}$, and $Cl^-$, etc.; after aging for 7 days (the result of comparison of the flow modifier particle composition prepared in the example 2 before and after aging at 140° C. is shown in FIG. 2), the flow modifier particle composition were taken out, and were observed for any damage of the flow modifier particle composition. Results: all of the flow modifier particle composition in the examples 1-10 and comparative examples 2-4 have no damage. It is seen from the test results: the flow modifier particle composition provided in the present invention have a high salinity-resistant property at high temperatures, and thereby can realize deep flow modification in high-temperature and high-salinity fracture-cave reservoirs.

Test Case 3

This test case is used to test the fracture plugging capability of the flow modifier particle composition and the flow modifier.

Figure 3:
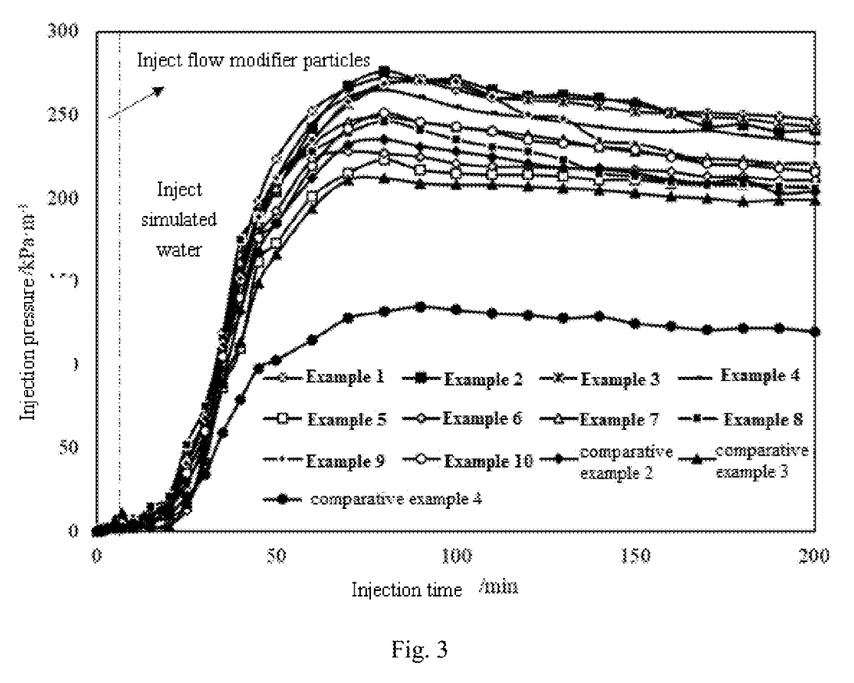
FIG. 3 shows the variations of injection pressure in fractures after the flow modifiers prepared in examples 1-10 and comparative examples 2-4 are injected at corresponding formation temperatures.

The entire physical simulation experiment is carried out at corresponding formation temperatures that the flow modifier particle composition can withstand (as shown in Table 1); specifically, the flow modifiers were respectively injected into densify sandstone fractures in 3.5 mm width, 25 mm height, and 100 mm length, at 0.5 mL/min. injection rate, in 7.0 mL injection volume; after the test installation is held in still state for 1 day, simulated formation test is injected. The variations of injection pressure in the examples 1-10 and comparative examples 2-4 were shown in FIG. 3. It is seen from the test results: the flow modifier particle composition and the flow modifier provided in the present invention have outstanding fracture plugging capability, and can attain a good effect of water flow channel plugging at high temperatures.

The results in the above test cases and Tables 1 and 2 demonstrate that the flow modifier particle composition and the flow modifier provided in the present invention have excellent temperature-resistance, adhesiveness, swelling, and salinity-resistance properties, can withstand high temperature in a wide range, are highly salinity-resistant, have outstanding fracture plugging capability, and can significantly improve the recovery ratio of a high-temperature fracture-cave reservoir, selectively modify deep dominant water flow channels in the formation, and thereby improve the swept volume in the fracture-cave reservoir. The flow modifier particle composition can be carried into the formation easily because the density of the flow modifier particle composition is controllable and close to the density of the carrying fluid; besides, the carrying fluid is an active water fluid with viscosity equivalent to the viscosity of water, and can disperse the flow modifier particle composition well.

While some preferred embodiments of the present invention were described above, the present invention is not limited to the specific details in those embodiments. Those skilled in the art can make various simple modifications and variations to the technical scheme of the present invention within the scope of the technical concept of the present invention. However, all those modifications and variations shall be deemed as falling into the scope of protection of the present invention.

In addition, it should be noted that the specific technical features described in above specific embodiments may be combined in any appropriate form, provided that there is no conflict among them. To avoid unnecessary repetition, various possible combinations were not described specifically in the present invention.

Moreover, different embodiments of the present invention may also be combined freely as required, as long as the combinations don't deviate from the ideal and spirit of the present invention. However, such combinations shall also be deemed as falling into the scope disclosed in the present invention.

The invention claimed is:

1. A flow modifier particle composition comprising a viscoelastic base agent, a selective solubilizer, a density modifier, a sweller, and an optional plasticizer, wherein based on the total weight of the flow modifier particle composition, the content of the viscoelastic base agent is 30-90 wt %, the content of the selective solubilizer is 3-30 wt %, the content of the density modifier is 0.1-30 wt %, the content of the sweller is 1-30%, and the content of the plasticizer is 0-10 wt %; wherein the viscoelastic base agent is a polymer selected from the group consisting of polyethylene, polystyrene, polypropylene, nylon and ABS resin, the selective solubilizer is a material selected from the group consisting of C5 petroleum resin, C9 petroleum resin, rosin resin, and rosin modified phenolic resin, the density modifier is hollow beads and/or coal ash, the sweller is a material selected from the group consisting of expanded graphite, modified starch, polyacrylamide and cross-linked cellulose, and the plasticizer is fibers and/or whiskers.

2. The flow modifier particle composition according to claim 1, wherein the viscoelastic base agent is a polymer selected from the group consisting of polyethylene, polystyrene, and nylon.

3. The flow modifier particle composition according to claim 1, wherein the selective solubilizer is C5 petroleum resin, C9 petroleum resin, or a combination thereof.

4. The flow modifier particle composition according to claim 1, wherein the fibers are a type of fibers selected from the group consisting of natural fibers, artificial fibers and synthetic fibers, and the whiskers are a type of whiskers selected from the group consisting of calcium sulfate whiskers, silicon carbide whiskers and gypsum whiskers.

5. The flow modifier particle composition according to claim 1, wherein the density of the density modifier is 0.2-2.9 g/cm$^3$.

6. The flow modifier particle composition according to claim 1, wherein based on the total weight of the flow modifier particle composition before the flow modifier particle composition are dissolved in crude oil, the percentage of residue of the flow modifier particle composition after the flow modifier particle composition are dissolved in crude oil is lower than 30 wt %.

7. The flow modifier particle composition according to claim 1, wherein the density of the flow modifier particle composition is 0.80-1.20 g/cm$^3$, and the particle diameter of the flow modifier particle composition is 0.2-20.0 mm.

8. The flow modifier particle composition according to claim 1, wherein the flow modifier particle composition has a swelling ratio in a range of from 1 to 30.

9. A flow modifier comprising the flow modifier particle composition according to claim 1, a carrying fluid that contains water and a surfactant.

10. The flow modifier according to claim 9, wherein the weight ratio of the flow modifier particle composition to the carrying fluid is 1-30:70-99.

11. The flow modifier according to claim 9, wherein the absolute density difference between the flow modifier particle composition and the carrying fluid is no more than 0.02 g/cm$^3$.

12. The flow modifier according to claim 9, wherein the weight ratio of the water to the surfactant is 99.50-99.99: 0.01-0.50.

13. A method for preparing the flow modifier according to claim 9 comprising:
(1) adding the viscoelastic base agent, the selective solubilizer, the density modifier, the sweller, and the optional plasticizer sequentially, and mixing them by intensive stirring to obtain a mixture;
(2) molding the mixture obtained in the step (1) by extrusion molding to obtain flow modifier particle composition; and
(3) mixing the flow modifier particle composition obtained in the step (2) with the carrying fluid to obtain the flow modifier.

14. The method according to claim 13, wherein in the step (2), the temperature of the extrusion molding is 150-300° C.

15. A method of using the flow modifier particle composition according to claim 1 in exploitation of fracture-cave reservoirs.

16. A method of using the flow modifier according to claim 9 in exploitation of fracture-cave reservoirs.

17. The flow modifier according to claim 12, wherein the surfactant is polyoxyethylene carboxylate and/or betaine.

* * * * *